No. 807,974. PATENTED DEC. 19, 1905.
E. A. STICKLER.
PROPELLER.
APPLICATION FILED JULY 10, 1905.
Fig. 1. Fig. 3.
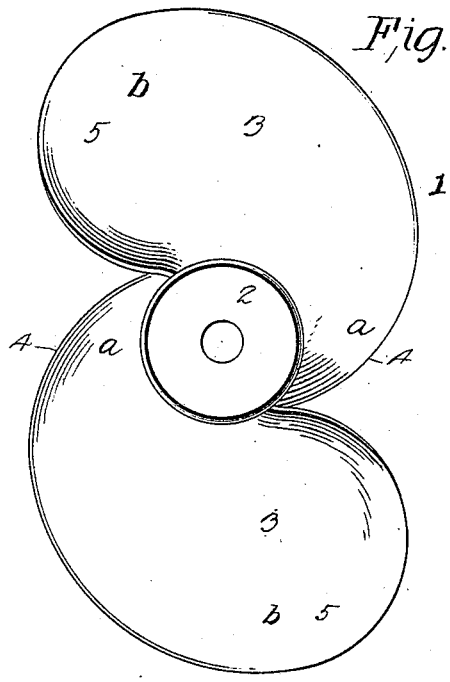
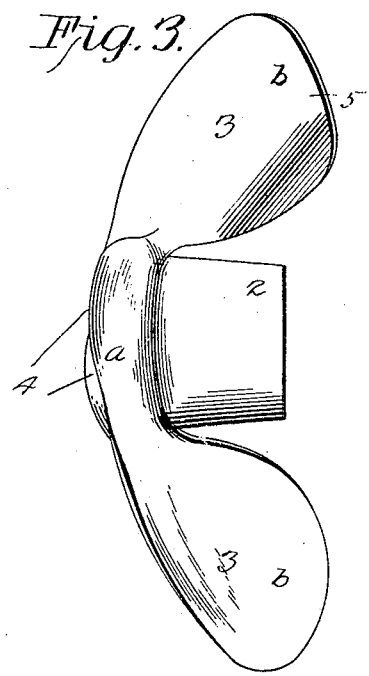
Fig. 2. Fig. 4.
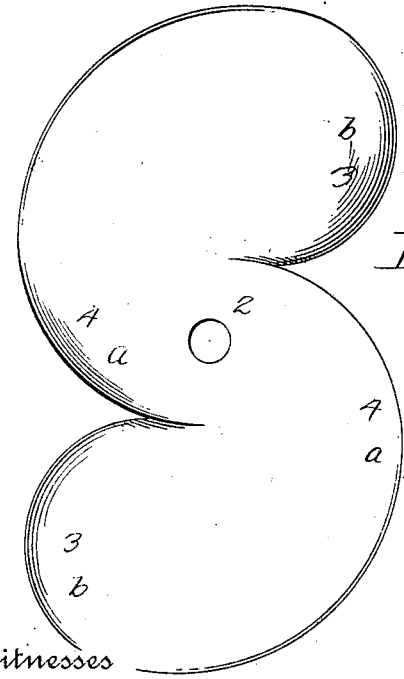
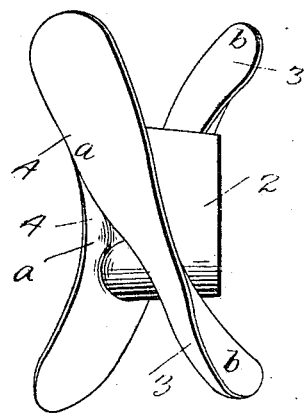
Witnesses
Geo. Hilton
C. H. Griesbauer
Inventor
E. A. Stickler,
by H. B. Willson
Attorney

UNITED STATES PATENT OFFICE.

EDWARD A. STICKLER, OF PORTAGE, WISCONSIN.

PROPELLER.

No. 807,974.  Specification of Letters Patent.  Patented Dec. 19, 1905.

Application filed July 10, 1905. Serial No. 269,085.

*To all whom it may concern:*

Be it known that I, EDWARD A. STICKLER, a citizen of the United States, residing at Portage, in the county of Columbia and State of Wisconsin, have invented certain new and useful Improvements in Propellers; and I do declare the following to be a full, clear, and exact description of the invention, such as will enable others skilled in the art to which it appertains to make and use the same.

This invention relates to improvements in propeller-wheels.

The object of the invention is to provide a propeller-wheel the blades of which are so shaped as to prevent the catching of grass, weeds, &c., thereby adapting the same for use in waters containing more or less vegetable growth.

With the above and other objects in view the invention consists of certain novel features of construction, combination, and arrangement of parts, as will be hereinafter described and claimed.

In the accompanying drawings, Figure 1 is an elevation of one end of the propeller. Fig. 2 is a similar view of the opposite end. Fig. 3 is a side view of the propeller, and Fig. 4 is a similar view taken at right angles to Fig. 2.

Referring more particularly to the drawings, 1 denotes the propeller-wheel, which consists of a central hub 2, on which is arranged spirally-disposed cam-shaped blades 3, said blades being preferably formed integral with the hub 2 and at the beginning of the blades and for a short distance around the same are formed with a sharp forwardly beveled and curved edge 4. At their opposite ends the blades are curved to form rearwardly-projecting wings 5. The rear edge of each of the said wings presents a convex curve that extends from the outer edge of the blade inwardly to the hub. By constructing the blades in this manner the same will begin to take water at point *a* with a gradual gain to the point *b*. The blades are thus running toward the water with a gradual increase in the width of the blades from the point *a* to point *b*, thereby causing the grass, weeds, &c., to glance off the blades between points *a* to *b*, thus preventing the catching and accumulation of said grass or weeds on the blades, which retard and often prevent the revolution of the propeller-wheel.

A propeller-wheel having blades constructed as herein shown and described will also be found to be exceptionally efficient in operation, and owing to the shape of said blades the propeller is adapted to be used in water containing a thick growth of grass or weeds without affecting the action of the propeller.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described propeller having the hub and the spiral cam-shaped blades, the front sides of which project from the front portion of the hub, said blades being curved rearwardly over the rear portion of the hub, widened progressively from the hub rearwardly and terminating in rearwardly-projecting wings, the rear edges of which present convex curves that extend from the outer edges of the blades inwardly, and the inner edges of which are spaced from the sides of the hub and merge in the front portions of the blades attached to the hub.

In testimony whereof I have hereunto set my hand in presence of two subscribing witnesses.

EDWARD A. STICKLER.

Witnesses:
J. J. EULBERG,
ANDREW KIEFER.